United States Patent [19]

Futch

[11] 3,926,489
[45] Dec. 16, 1975

[54] APPARATUS FOR USE IN ASSEMBLING FOOD ON TRAYS

[76] Inventor: Max Gerald Futch, 332 Wilton Drive, Baton Rouge, La. 70815

[22] Filed: Oct. 4, 1974

[21] Appl. No.: 512,001

[52] U.S. Cl. ............... 312/250; 198/181; 186/1
[51] Int. Cl.² ............... B65G 15/00; A47B 91/00
[58] Field of Search ........... 312/250, 236, 268; 198/181; 186/1 TA

[56] References Cited
UNITED STATES PATENTS

| | | | |
|---|---|---|---|
| 519,630 | 5/1894 | Hogg | 198/181 |
| 751,681 | 2/1904 | Philippi | 198/181 |
| 1,881,898 | 11/1932 | Olson | 186/1 R |
| 2,894,604 | 7/1959 | McMillan | 186/1 R |
| 2,900,045 | 8/1959 | Conklin | 186/1 R |

Primary Examiner—Paul R. Gilliam
Assistant Examiner—Doris L. Troutman
Attorney, Agent, or Firm—E. Donald Mays

[57] ABSTRACT

An apparatus for use in assembling hot and cold food portions onto moving trays. The apparatus includes a generally rectangular cabinet section which may be mounted on casters for portability. The top surface of the cabinet is provided with a plurality of hot food wells and frost plates adjacent each of its longitudinally extending sides. Mounted centrally on the top of the cabinet and extending upwardly therefrom is a tray conveyer assembly. Food trays carried by continuously rotating tray carriers mounted on the conveyer assembly pass in front of attendants who place the required portions of hot and/or cold food upon the trays.

10 Claims, 6 Drawing Figures

APPARATUS FOR USE IN ASSEMBLING FOOD ON TRAYS

BACKGROUND OF THE INVENTION

1. Field of the Invention

This invention relates to an apparatus for use in assemblying individual food portions on service trays which are to be transported to a remote location.

2. Description of the Prior Art

The pre-preparation of food trays containing hot and cold food portions, together with the necessary eating and drinking utensils, is routinely carried out in institutions such as hospitals, rest homes and in commercial kitchens for meal preparation for airlines. Various systems for food assembly have been devised for use in the above places. However, most of the systems are permanent and fixed in place and are thus quite expensive and and do not provide for very much flexibility in floor space utilization and/or modification of the food assemblying procedure. The most frequently used tray assembly system in hospitals has been the straight line conveyer used in conjunction with hot and cold food counters arranged perpendicularly to the conveyer that requires a large amount of floor space which is extremely costly in commercial kitchens. In some previous food assembly systems, the fixed hot food wells and cold trays are set in permanent counter installations wherein a conveyer belt runs parallel to the counter on the side opposite where the food attendant stands, thus requiring them to reach across the hot pans and cold plates to place food portions on the trays as they move past the attendants. While the prior art has recognized the advantage of having a portable system for meal assembly, the layout of the systems have been conventionally the same as those utilized in fixed installations. More recent mobile or portable food assembly systems have utilized a conveyer assembly carrying the trays around the peripheral portion of the cabinet and have the bulk food containers or pans mounted on shelves positioned inwardly of the tray conveyer. Such an arrangement requires the attendants to reach across the trays and place the individual food portions thereon. Additionally, the bulk food pans must be put in place and removed when empty across the top of the conveyer carrying the food trays, thus requiring the food attendants to move out of position during the placement of the bulk foods. The system also suffers another disadvantage in that contamination can occur from foreign material that may drop from the underside of the bulk food receptacles as they are moved in and out across the tray conveyer assembly.

Therefore, it can be seen that there is a need in the food service industry for a compact, unitary food assembly system that occupies a small amount of floor space, that preferably is readily movable from one location to another, and that provides convenience and cleanliness in assemblying the various food portions onto serving trays.

SUMMARY OF THE INVENTION

It is an object of the present invention to provide an apparatus for use in assemblying individual food portions on trays, which apparatus is compact, efficient and entirely self-contained.

It is another object of the present invention to provide an apparatus for use in assemblying individual food portions on trays wherein the food can be placed on the trays conveniently by the attendant.

It is still another object of the present invention to provide an apparatus for use in assemblying individual food portions on trays wherein the trays are elevated above the surface of the bulk foods storage portion of the apparatus.

The foregoing and other objects of the present invention are realized in an apparatus for making up serving trays with food portions which includes a cabinet assembly having a length greater than its width. An elongated tray conveyer assembly is centrally and longitudinally positioned on the top surface of the cabinet and extends upwardly therefrom. The tray conveyer assembly is provided with means located adjacent its upper end and for moving a plurality of the serving trays in a closed path. The top surface of the cabinet is provided with means on each of its longitudinally extending side portions for accommodating a plurality of bulk or individually portioned food containers for placement of individual portions on each of the serving trays by an attendant.

BRIEF DESCRIPTION OF THE DRAWING

The preferred embodiment of this invention, including the tray conveyer system and a bulk food holding assembly, will be more readily understood by the following detailed description when taken in conjunction with the following drawings:

FIG. 6 is a cross-sectional view of a portion of the chain conveyer taken along line 6—6 of FIG. 4.

DESCRIPTION OF THE PREFERRED EMBODIMENTS

Figure 1:
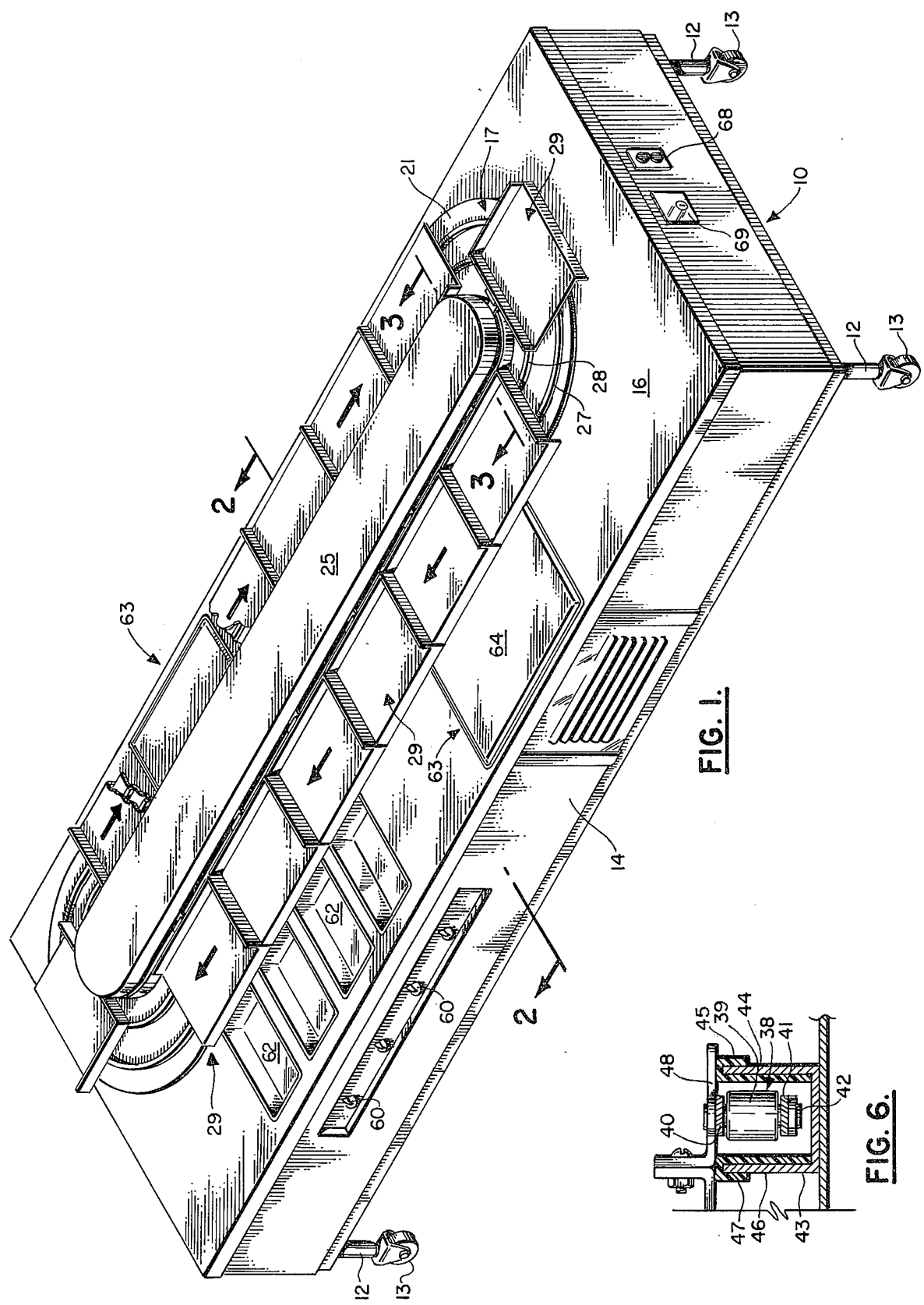
FIG. 1 is an elevational, perspective view of an apparatus for use in assemblying individual food portions on serving trays constructed in accordance with the present invention.
Figure 2:
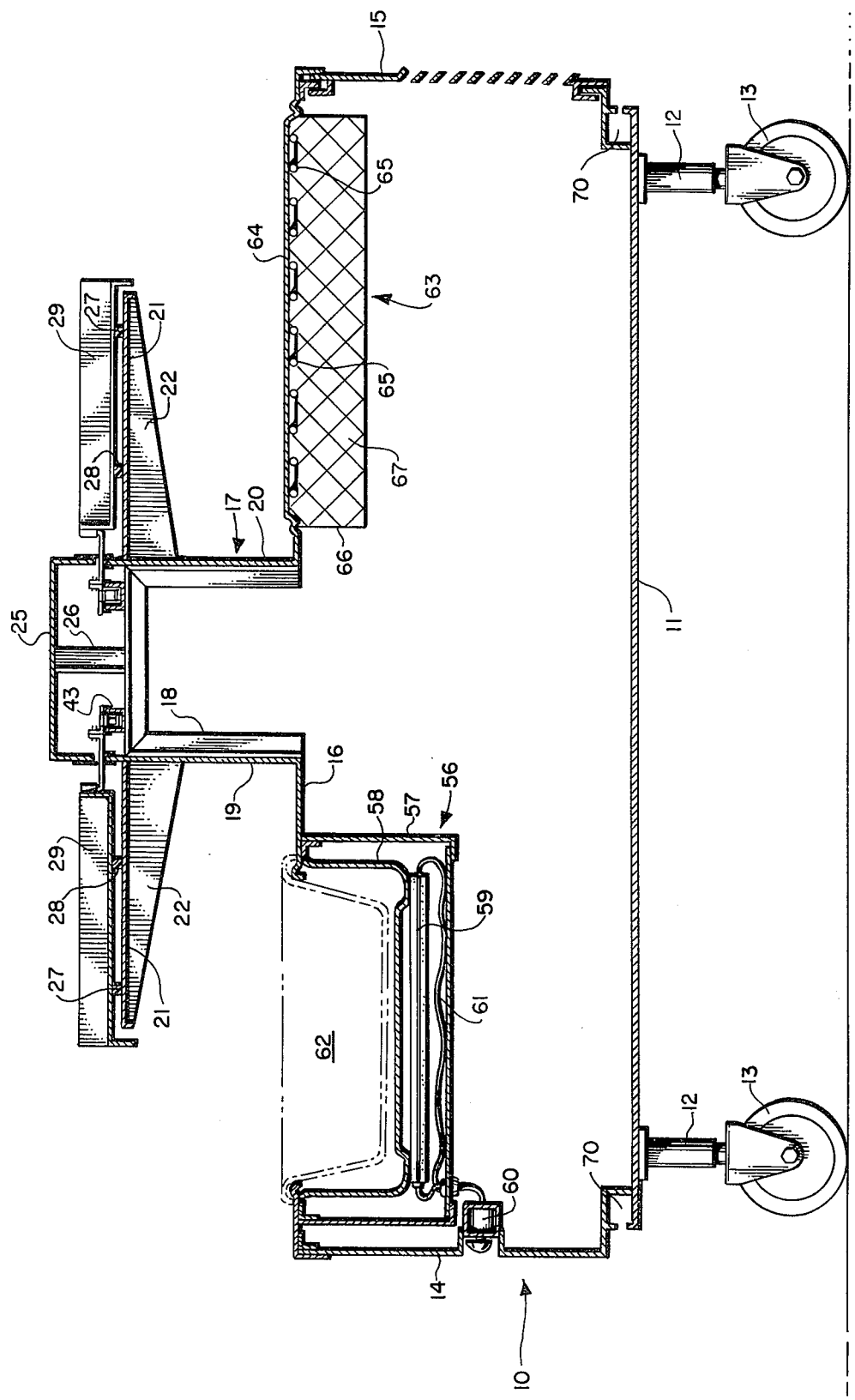
FIG. 2 is an enlarged, transverse cross section of the apparatus of FIG. 1 taken along line 2—2.

Referring now to FIGS. 1 and 2, the apparatus of the present invention for use in assemblying food portions on serving trays includes a generally elongated, rectangular cabinet, designated generally by the numeral 10. The cabinet includes a base 11 which may be supported above the floor level and made portable by means of downwardly extending, tubular support members 12 which receive casters 13. While only four tubular supports and casters are shown, one in each corner, it is understood that any number of supports and casters may be utilized to provide the necessary support and mobility for the food assembly apparatus. A left sidewall member 14 and a right sidewall member 15 are attached to the base 11 by any suitable means, e.g. welding, bolting, and support top wall 16 of the cabinet. The supports and casters may be omitted if it is desired to utilize the apparatus as a permanent installation. The base 11 may rest directly on the floor and sidewalls 14 and 15 lengthened to raise the top surface of the cabinet to a convenient height.

A tray conveyer assembly, designated generally by the numeral 17, is centrally positioned on the top surface 16 of the cabinet 10 and extends upwardly therefrom and longitudinally substantially the full length of the cabinet. The tray conveyer assembly includes a plurality of spaced apart, inverted, U-shaped support brackets 18 having their ends attached to the under bracing (not shown) of the top surface 16 of the cabinet and extending upwardly therefrom. Attached to the support brackets are the left tray conveyer wall 19 and the right conveyer wall 20. The walls may be attached to the support brackets by any suitable means, e.g., screws, nuts and bolts, or welding. A continuous, endless, elliptical shelf 21 extends outwardly from the sidewalls 19 and 20 adjacent their upper ends and is supported by means of braces 22 which are preferably attached to the sidewalls 19 and 20 and to the support brackets 18 by means of bolts 23 and nuts 24 as may be seen in FIG. 3. The removable top cover 25 of the conveyer assembly is supported over the sidewalls 19 and 20 by means of a plurality of vertical support members 26 resting at their lower ends on top of support brackets 18.

Figure 5:
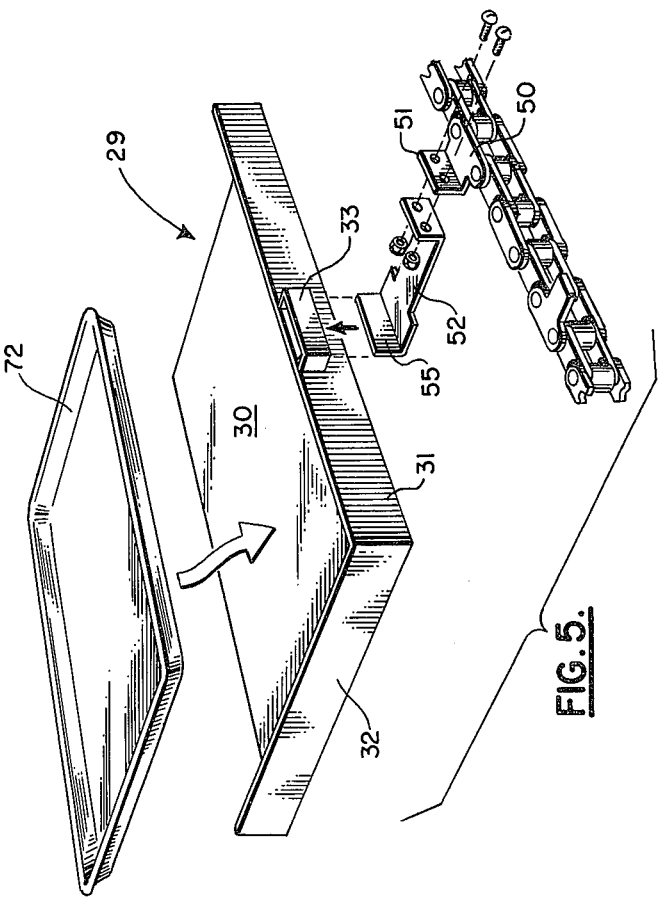
FIG. 5 is an exploded, perspective, elevational view of a portion of the tray conveyer apparatus showing the drive chain, tray conveyer coupling means, tray conveyer and serving tray.

A pair of spaced apart, continuous, generally rectangularly shaped runners or slides 27 and 28 are mounted on the top surface of shelf 21 and slidingly support a plurality of tray carriers, designated generally the numeral 29. Each tray carrier 29 includes a bottom wall 30, an upturned back wall 31 and one upturned end wall 32. Each tray carrier back wall 31 has attached thereto a generally U-shaped, outwardly projecting bracket member 33. Each tray carrier supports and conveys a food serving tray 72 as seen in FIG. 5.

Figure 3:
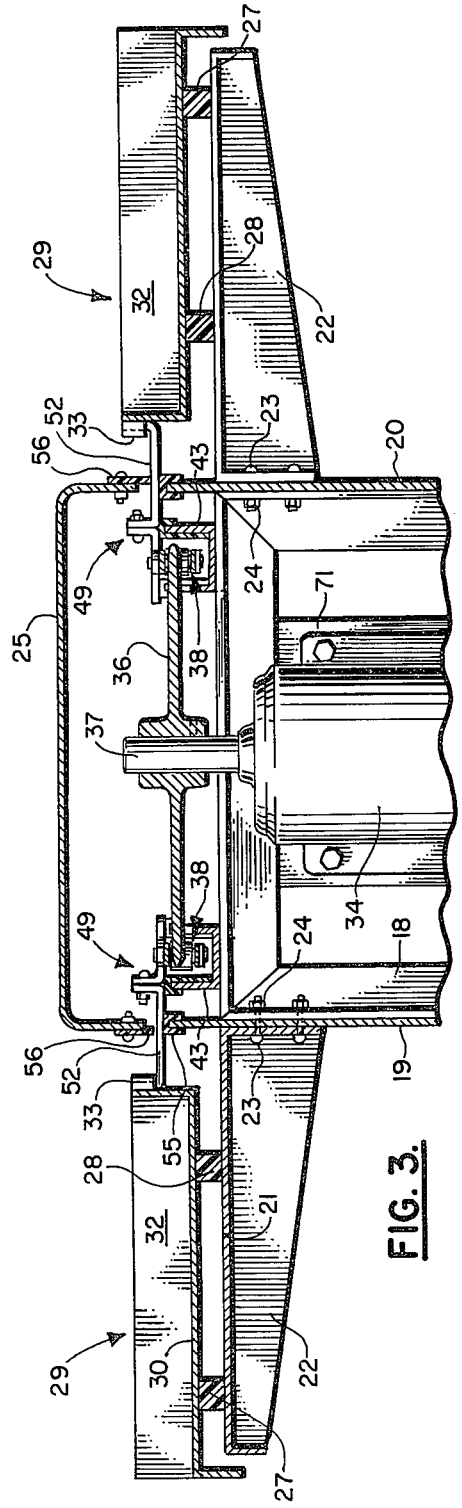
FIG. 3 is an enlarged, cross-sectional view of the tray conveyer assembly portion of the apparatus of FIG. 1 taken along line 3—3.

As seen in FIG. 3, the tray conveyer assembly includes an electric, variable speed, drive motor 34 which is mounted on a support plate 71 which is attached to one of the brackets 18 adjacent one end of the tray conveyer assembly. Sprocket 36 is mounted on drive motor shaft 37 for rotation therewith. Sprocket 36 engages one end of an endless drive chain assembly 38 which travels the length of the tray conveyer housing. As seen more clearly in FIGS. 4 and 6, the drive chain assembly 38 includes a plurality of rollers 39 coupled together by means of top links 40 and bottom links 41 carried by coupling pins 42 extending through axial openings (not shown) in the rollers 39. Chain drive 38 is received in a generally U-shaped, endless, elliptical track 43 which is fixed to the top surface of the brackets 18 and extends the entire length of the tray conveyer assembly 17. As seen more clearly in FIG. 6, the right sidewall 44 of the track has a generally U-shaped slide cap 45 which is received over its top end. The left sidewall 46 of the track is provided with a like slide cap 47. The inner walls of both of the slide caps 45 and 47 extend over the entire length of the inner surface of the sidewalls 44 and 46. It will be understood that at the end of the tray conveyer assembly opposite the motor there is provided an idler sprocket (not shown) which engages the end of the chain drive opposite the drive motor. The mounting mechanism of the sprocket is adjustable for taking up slack of the chain caused by stretching of the chain. The inner wall 44 of the track is cut away at each end of the track to permit the sprockets to engage the ends of the drive chain 38.

Figure 4:
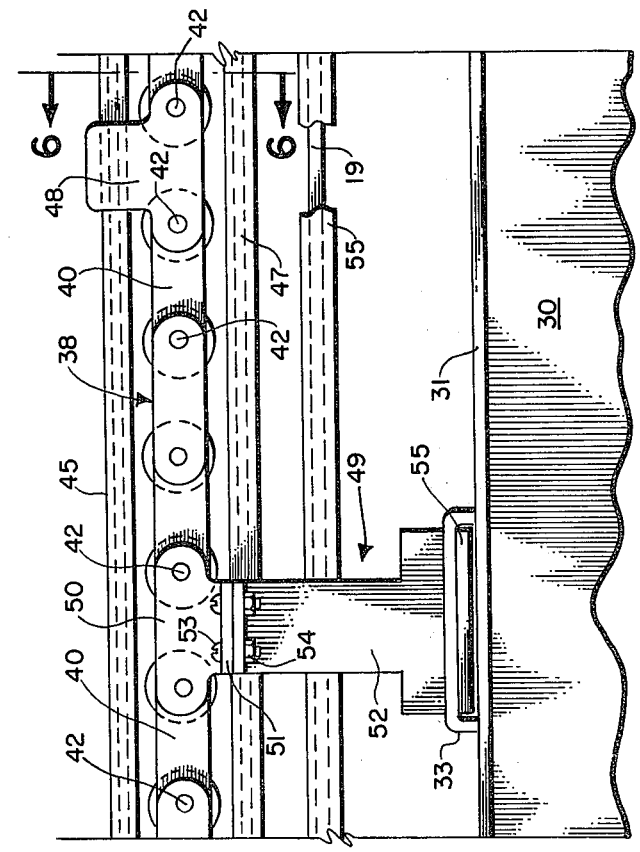
FIG. 4 is an enlarged, plan, broken view of a portion of the tray conveyer assembly of FIG. 3 showing the conveyer chains and guides.

At periodic intervals on the drive chain assembly 38, there is provided generally T-shaped support guides 48 having one end coupled to the chain by means of the pins 42-42 and the other end slidably abutting the top of slide cap 45 on the track 43. These support guides hold the chain freely suspended within the guide track 43, thus minimizing frictional contact of the lower end of the chain drive assembly with the track 43. At intervals which are determined by the length of the tray support 29, there is attached to the chain a plurality of tray carrier drive brackets generally designated 49. As seen in FIG. 5, each bracket includes a rear section 50 which is coupled to the drive chain assembly 38 by means of the pins 42—42 and which has an upturned end 51 coupled to bracket extension member 52 by means of bolts 53 and nuts 54. Bracket extension member 52 has an upturned outer end 55 which is received in the slot provided in the bracket 33 on the tray carrier 29. Thus when the conveyer chain moves within the chain guide 43, the tray drive bracket 49 coupled each tray carrier 29 to the drive chain thereby moving it in the direction of the arrows shown in FIG. 1 over the shelf 21 slidingly supported on the runners or slides 27 and 28. It is preferred that the runners 27 and 28 be made of a very low friction material, preferably Teflon or other fluorinated thermoplastic material. Additionally, the slide caps and linings 45 and 47 for the chain track should be made of similar materials. As seen in FIGS. 3 and 4, bracket extension member 52 extends through a space provided between the downturned ends of the top wall of the coveyer assembly and the sidewalls 17 and 19 of the conveyer assembly. The upper ends of left sidewall 19 and right sidewall 17 are provided with a U-shaped slide cap 55 and the downturned walls of the top 25 are also provided with a flexible, depending band 56 which will narrow the opening between the sidewalls and the downturned ends of the top wall of the tray assembly.

Referring now to FIGS. 1 and 2, it can be seen that the top surface 16 of the cabinet is provided with a plurality of hot wells, designated generally by the numeral 56. Each hot well includes a generally rectangular open top box structure 57 which is attached to the underside of the top surface 16 of the cabinet adjacent an opening therein. Each box encloses a water pan member 58 which has an electrical heating element 59 attached to the bottom thereof. Heating element 59 is connected to thermostat 60 by means of an electrical wiring 61 extended to wiring (not shown) in electrical raceway 70 provided on all sides of the cabinet. Each hot well 56 is adapted to receive a generally rectangular hot food pan 62 which is supported on its lip by the peripheral edge of the water pan member 58.

It is to be understood that a like number, or any number, of hot food wells and hot food pans are also provided on the right-hand side of the cabinet.

The top surface of the cabinet is also preferably provided on each side with one or more cold plate assemblies, designated generally 63. As seen in FIG. 2, each cold plate assembly includes a top metal cold surface 64 which is provided with a plurality of refrigerant runs 65 attached to its undersurface. A generally rectangular insulation box 66 is attached to the underside of the top surface 64 of the cold plate adjacent its periphery and is filled with insulation 67 to minimize refrigeration loss. The required number of standard refrigerations units (not shown) are located within the cabinet 10 and are connected by suitable means (not shown) to the cold plates 63. Wiring (not shown) from the refrigeration units and controls are extending to electrical raceway 70.

Start-stop control 67 for the variable speed drive unit on the tray conveyer is located on both ends of the cabinet. A locked door 69 is also provided at each end of the cabinet and provides access to a suitable conveyer motor speed control (not shown) for the tray conveyer drive motor 34. Cabinet 10 is equipped with electrical outlets (not shown) located in electrical raceway 70 for auxiliary equipment such as toasters, heated plate dispensers, etc. All wiring for hot food wells 56, cold plates 63 and receptacles for auxiliary equipment (not shown) is extended through electrical raceway 70 to an electrical panel box with appropriately sized circuit breakers (not shown) connected to a cord and plug (not shown) for a single electrical connection to a building receptacle.

Prior to the intended utilization of the apparatus of the present invention, the electrical lead (not shown) furnishing the main power to the assembly will be plugged into the proper receptacle, the refrigeration units activated for the cold plates and the heater units activated for the hot food wells. If wet heat is desired in some of the hot food wells, water will be placed in the containers 58 and allowed to come to the proper temperature. Hot foods will be delivered from the preparation area in the hot food pans 62 which are placed in the hot food wells 56. Predished cold foods such as salads, ice cream, etc., will be placed in appropriate containers and positioned on the cold plates 64. The portions of the top walls 16 of the cabinet 10 which do not include hot food wells 56 and cold plates 63 will accommodate food items that do not require heating or cooling. Thus flexibility is built into cabinet 10 to allow for rearrangement of hot food wells 56 and cold plates 64 to best suit the needs of the user. Serving attendants will then take their positions around the entire perimeter of the cabinet. One attendant positioned at the forward end of the apparatus will place a food serving tray 72, which may contain the eating utensils and condiments and other accessories, on each of the tray carriers 29 as each of the carriers passes in front of her position. The supervisor will have adjusted the tray conveyer speed control in order to convey the tray carriers 29 around the shelf 21 at the desired speed. As each serving tray passes each attendant, the attendant places thereon the food portion for which they are responsible. Each serving tray continues on around the tray support assembly until it reaches the edge of the right-hand forward end of the assembly where it will be removed by an attendant and placed in a suitable transport container (not shown) for conveyance to the hospital patient or forwarding to the airline in case of air flight food preparation.

From the foregoing, it can be seen that the apparatus for use in food assembly of the present invention provides a portable, compact, versatile, economic and efficient unit which is readily adapted for rapid assembly of individual food portions onto serving trays. The arrangement of the tray conveyer assembly above the middle center surface of the cabinet provides easy loading of the individually served portions on each serving tray by each attendant as it passes the attendant's position. Contamination of the food by any other food which is being served is minimized by the serving trays being in the elevated position where no foreign matter or other food particles will fall into the individual serving trays. It is preferred that the apparatus be constructed of stainless steel, at least in its exterior portion, in order that it may be corrosion proof and may be easily cleaned and maintained in a sanitary condition. If desired, however, the tray carriers 29 may be made from a suitable thermoplastic material which is capable of being sterilized.

While there has been described and illustrated a preferred embodiment of my invention, and several modifications have been indicated, it is to be understood that various further changes and modifications may be made therein by those skilled in the art without departing from the broad principle and intent of this invention.

What is claimed is:
1. A device for use in making up serving trays with food portions comprising:
   a. a cabinet assembly having two spaced apart, longitudinally extending, generally flat top counter surfaces;
   b. a hollow, narrow, elongated, serving tray conveyer assembly centrally and longitudinally fixedly positioned between said two top surfaces and extending upwardly a substantial distance therefrom,
      i. said tray conveyer assembly having end and sidewalls extending upwardly from said top surface, a continuous shelf projecting outwardly from said end and sidewalls adjacent their upper ends, a plurality of tray support means supported by said shelf for movement thereover, and means located in the upper portion of said tray conveyer assembly for moving said plurality of tray support means around a closed path; and
   c. each of said two top surfaces of said cabinet providing means for accommodating a plurality of bulk or individually portioned food containers for placement of individual portions on each of said serving trays by an attendant.

2. The device of claim 1 wherein said tray support moving means includes a rotatable wheel mounted within said conveyer assembly at each end thereof, drive means for driving one of said wheels, an endless, flexible drive member connected to each of said wheels, a plurality of spaced apart tray support drive brackets attached to said flexible drive member and extending transversely through an endless opening in the sides and ends of said housing, and coupling means on each of said tray supports for attaching thereto one of said drive brackets.

3. The device of claim 1 wherein at least one low friction slide member is mounted on the top surface of said shelf and extending completely therearound to slidingly support said plurality of tray support means.

4. The device of claim 1 including readily detachable means for coupling said tray support means to said flexible drive member.

5. The device of claim 2 wherein said wheels are sprockets and said flexible drive member is a drive chain assembly, which assembly is carried by a generally U-shaped, endless, elliptical track which is carried by said sidewalls of said conveyer assembly.

6. The device of claim 5 wherein said drive chain assembly includes a plurality of spaced apart, transversely extending tray carrier drive brackets and support guides, each being coupled at one end to said drive chain and being slidably supported by the upper end of one of the sidewalls of said U-shaped track.

7. The device of claim 6 wherein said upper end of each of the track sidewalls is provided with a slide cap of low friction material.

8. The device of claim 5 wherein said U-shaped track inner walls are covered by a layer of low friction material.

9. A device for use in making up serving trays with food portions comprising:
   a. an elongated, generally rectangular cabinet having tow spaced apart, longitudinally extending, generally flat, top counter surfaces with a plurality of openings therein;
   b. a hot food well or a cold plate assembly received in each of said plurality of openings provided in each of said two top surfaces;
   c. an elongated, generally rectangular tray conveyer assembly positioned between and fixedly connected at its base to said two top surfaces and extending upwardly therefrom and terminating inwardly from the ends of said cabinet,
      i. said tray conveyer assembly including a hollow housing having opposed sidewalls and end walls having a continuous shelf projecting freely outwardly from the upper end of said housing and supported by a plurality of brackets attached to said side and end walls,
      ii. a plurality of tray carriers slidingly supported by said shelf, and
      iii. a tray carrier drive assembly mounted within said hollow housing adjacent its upper end, said drive assembly including an endless drive chain carried by a pair of sprockets, one sprocket positioned at each end of said housing, one of said sprockets having a variable speed drive motor coupled thereto, said drive chain being connected to each of said tray carriers by a drive bracket extending transversely through a continuous opening provided in said hollow housing above the level of said shelf.

10. The device of claim 9 including a removable top cover for said hollow housing, said top cover having downturned sidewalls terminating above said hollow housing sidewalls to provide space therebetween for projection of said drive brackets therethrough.

* * * * *